US012596443B2

(12) United States Patent　　　　(10) Patent No.: US 12,596,443 B2
Tan et al.　　　　　　　　　　　　(45) Date of Patent: Apr. 7, 2026

(54) SYSTEM AND METHOD FOR OBTAINING USER INPUT WITH MAGNETIC SENSING USING A TRACK BALL

(71) Applicant: Dell Products L.P., Round Rock, TX (US)

(72) Inventors: Loo Shing Tan, Singapore (SG); Michiel Sebastiaan Emanuel Petrus Knoppert, Amsterdam (NL); Gerald Rene Pelissier, Mendham, NJ (US); Chiu-Jung Tsen, Zhubei City (TW); Brandon Joel Brocklesby, Pflugerville, TX (US); Hsu-Feng Lee, Taipei (TW); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/788,447

(22) Filed: Jul. 30, 2024

(65) Prior Publication Data

US 2026/0037082 A1　　Feb. 5, 2026

(51) Int. Cl.
G06F 3/0354 (2013.01)

(52) U.S. Cl.
CPC ................................ G06F 3/03549 (2013.01)

(58) Field of Classification Search
CPC .................................................. G06F 3/03549
See application file for complete search history.

(56) References Cited

U.S. PATENT DOCUMENTS

| | | | |
|---|---|---|---|
| 6,222,525 | B1 | 4/2001 | Armstrong |
| 6,563,533 | B1 | 5/2003 | Colby |
| 6,636,197 | B1 | 10/2003 | Goldenberg |
| 6,902,332 | B2 | 6/2005 | McLoone |
| 7,248,252 | B2 | 7/2007 | Amari |
| 7,368,673 | B2 | 5/2008 | Sato |
| 7,390,985 | B2 | 6/2008 | Onodera |
| 7,518,745 | B2 | 4/2009 | Guerraz |
| 7,570,254 | B2 | 8/2009 | Suzuki |
| 7,643,017 | B2 | 1/2010 | Lai |
| 8,190,993 | B2 | 5/2012 | Kondo |
| 8,217,742 | B2 | 7/2012 | Trudeau |
| 8,368,649 | B2 | 2/2013 | Hall |
| 8,581,718 | B2 | 11/2013 | Muller |
| 8,654,095 | B1 | 2/2014 | Cho et al. |

(Continued)

FOREIGN PATENT DOCUMENTS

WO　　　2007114631　A2　　10/2007

*Primary Examiner* — Amit Chatly
(74) *Attorney, Agent, or Firm* — WOMBLE BOND DICKINSON (US) LLP

(57)　　　　　　ABSTRACT

Methods and systems for providing computer implemented services using user input are disclosed. To obtain the user input, a passive human interface device may be used. The human interface device may include a trackball and a pair of magnets that may produce a magnetic field used to discern the user input. The pair of magnets may be mechanically coupled to the trackball and actuatable portions of the human interface device thereby facilitating both rotation and translation, respectively, of the pair of magnets responsive to actuations by a user. The rotation and translation of the pair of magnets may be sensed and used to identify user input provided by the user.

20 Claims, 11 Drawing Sheets

(56)                  References Cited

U.S. PATENT DOCUMENTS

| | | |
|---|---|---|
| 8,796,566 B2 | 8/2014 | Kerner |
| 8,918,219 B2 | 12/2014 | Sloo |
| 9,195,351 B1 | 11/2015 | Rosenberg |
| 9,285,903 B1 | 3/2016 | Yun |
| 9,323,356 B2 | 4/2016 | Kuo |
| 9,459,794 B1 | 10/2016 | Soegiono |
| 9,785,272 B1 | 10/2017 | Rosenberg |
| 10,331,220 B2 | 6/2019 | Hautson |
| 10,423,245 B2 | 9/2019 | Keating |
| 10,436,567 B2 | 10/2019 | Hautson |
| 10,502,271 B2 | 12/2019 | Battlogg |
| 10,504,672 B2 | 12/2019 | Hu |
| 10,649,556 B2 | 5/2020 | Chu |
| 10,719,145 B1 | 7/2020 | Files et al. |
| 10,838,525 B2 | 11/2020 | Chu |
| 10,845,764 B2 | 11/2020 | Ely |
| 10,921,914 B2 | 2/2021 | Hu |
| 10,962,935 B1 | 3/2021 | Ely |
| 11,036,318 B2 | 6/2021 | Bokma |
| 11,048,344 B1 | 6/2021 | Drezet |
| 11,106,291 B2 | 8/2021 | Takaoka |
| 11,360,440 B2 | 6/2022 | Perkins |
| 11,387,058 B2 | 7/2022 | Hwang |
| 11,531,306 B2 | 12/2022 | Ely |
| 11,809,646 B1 | 11/2023 | Knoppert et al. |
| 11,861,076 B1 | 1/2024 | Tan |
| 11,874,687 B1 | 1/2024 | Tan |
| 11,886,700 B1 | 1/2024 | Lee |
| 11,907,449 B2 | 2/2024 | Nieh |
| 11,923,842 B1 | 3/2024 | Tan |
| 2005/0083316 A1 | 4/2005 | Brian et al. |
| 2006/0012584 A1 | 1/2006 | Vassallo |
| 2006/0082545 A1 | 4/2006 | Choquet |
| 2006/0092136 A1* | 5/2006 | Nishimura .......... G06F 3/03549 |
| | | 345/167 |
| 2006/0205368 A1 | 9/2006 | Bustamante et al. |
| 2007/0152988 A1 | 7/2007 | Levin |
| 2007/0171205 A1 | 7/2007 | Steinberg |
| 2008/0231595 A1 | 9/2008 | Krantz |
| 2008/0238879 A1 | 10/2008 | Jaeger |
| 2009/0033632 A1 | 2/2009 | Szolyga et al. |
| 2010/0053085 A1* | 3/2010 | Hall ................... G06F 3/03543 |
| | | 345/163 |
| 2012/0038496 A1 | 2/2012 | Edwards |
| 2013/0314338 A1 | 11/2013 | Nam et al. |
| 2014/0184505 A1 | 7/2014 | Fullerton et al. |
| 2014/0267150 A1 | 9/2014 | Masashi |
| 2015/0168123 A1 | 6/2015 | Hautson |
| 2015/0277598 A1 | 10/2015 | Aurongzeb et al. |
| 2016/0041678 A1 | 2/2016 | Wu |
| 2016/0195937 A1 | 7/2016 | Tachiiri |
| 2016/0299606 A1 | 10/2016 | Go |
| 2016/0313819 A1 | 10/2016 | Ancona et al. |
| 2018/0154774 A1 | 6/2018 | Park |
| 2018/0314316 A1 | 11/2018 | Xu et al. |
| 2019/0113966 A1 | 4/2019 | Connellan et al. |
| 2019/0187856 A1 | 6/2019 | Bruwer et al. |
| 2019/0302904 A1 | 10/2019 | Nieh |
| 2019/0339776 A1 | 11/2019 | Rosenberg et al. |
| 2020/0004346 A1 | 1/2020 | Vlasov |
| 2020/0371625 A1 | 11/2020 | Katsurahira et al. |
| 2022/0200337 A1 | 6/2022 | Watanabe |
| 2022/0342437 A1 | 10/2022 | Xie |
| 2022/0352635 A1 | 11/2022 | Compton |
| 2024/0382272 A1* | 11/2024 | Sprenger ............... A61B 34/30 |

* cited by examiner

Magnet
230

Sensing
Element 202

Magnet
230

Sensing
Element 202

Button 222

Actuation Element 238

Magnet 230

Retention Element 240

Scroll Control 226

Support Element 236

Rotational Shaft 242

Body 220

Rotational Shaft 244

Retention Element 240

Support Element 236

SYSTEM AND METHOD FOR OBTAINING USER INPUT WITH MAGNETIC SENSING USING A TRACK BALL

FIELD

Embodiments disclosed herein relate generally to user input in computing systems. More particularly, embodiments disclosed herein relate to systems and methods to obtain user input.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

FIGS. 2G-2J show cross section diagrams of a human interface device in accordance with an embodiment.

DETAILED DESCRIPTION

Figure 1:
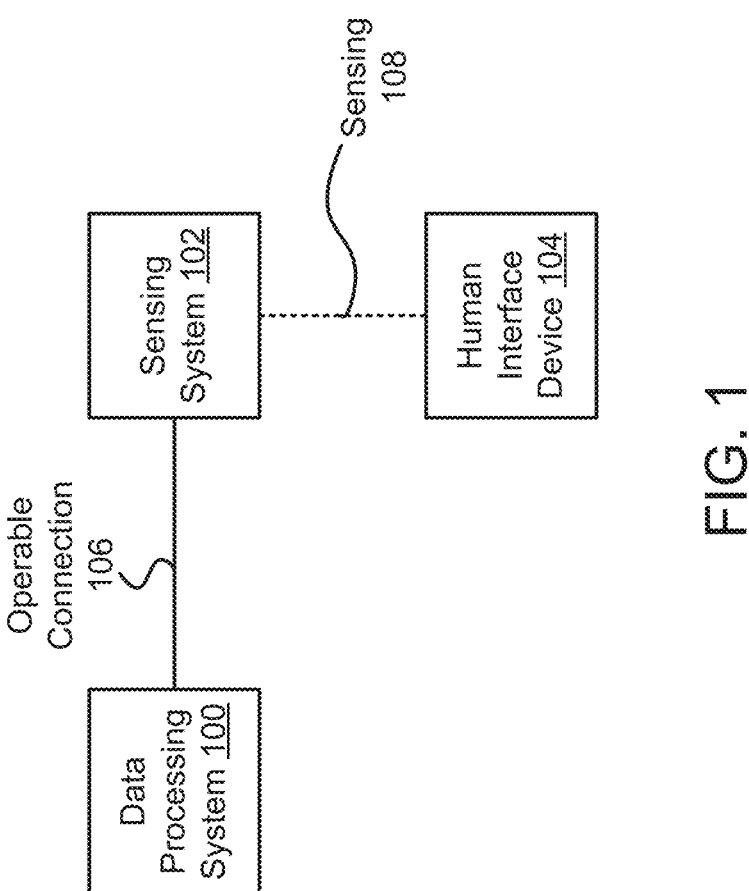
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic field distributions detectable by a sensing system. The sensing system may sense the magnetic field distributions and obtain information reflecting changes in the position and/or orientation of a pair of magnets of the human interface device that generates the magnetic field distributions. Thus, information reflecting actuations of the human interface device by the user may be encoded in the magnetic field distributions and may be sensed.

The obtain information may then be used to identify, for example, user input provided by the user. For example, the information regarding changes in the position and/or orientation of the pair of magnets may be translated into user input. The user input may then be used to drive computer implemented services.

For example, the user input may be provided by the user to activate certain functionalities, change functionalities, terminate functionalities, and/or invoke desired activities by a data processing system.

By using a magnet and mechanical linkage to the magnet, the human interface device may not need to be powered, may include fewer components thereby reducing the likelihood of component failures, may be made lighter/smaller thereby reducing loads placed on user of user input devices, etc.

By doing so, a system in accordance with embodiments disclosed herein may have improved portability and usability when compared to other types of devices used to obtain user input that may be powered. Thus, embodiment disclosed herein may address, among others, the technical challenge of loads placed on users during acquisition of user input and mechanical or electrical failure of devices tasked with obtaining user input.

In an embodiment, a human interface device is provided. The human interface device may include a track ball; and a pair of magnets mechanically coupled to the track ball to encode movement of the track ball in a magnetic field distribution emanating from the pair of magnets.

The pair of magnets may be positioned on different sides of the track ball.

Magnetic poles of the pair of magnets may be aligned with planes that are at right angles to each other.

The pair of magnets may be further mechanically coupled to encode depressions of at least two buttons of the human interface device in the magnetic field distribution.

The pair of magnets may be mechanically coupled to the track ball to cause portions of the magnetic field distribution to rotate based on rotation of the track ball.

The pair of magnets may be mechanically coupled to the track ball to cause portions of the magnetic field distribution to rotate based on rotation of the track ball.

The pair of magnets may be mechanically coupled to the at least two buttons to cause the portions of the magnetic field distribution to translate based on the depressions of the at least two buttons.

The pair of magnets may be mechanically coupled to the at least two buttons to cause the portions of the magnetic field distribution to return to a default set of positions based on releasing of the depressions of the at least two buttons.

The human interface device is unpowered.

The magnetic field distribution extends beyond boundaries of the human interface device to facilitate sensing of the magnetic field distribution by sensing systems.

The human interface device may also include: a mechanical coupling including: a pair of shafts in physical contact with the track ball and positioned: in planes that are at right angles to one another, and offset from one another; retention elements coupled to the pair of shafts, the retention elements being adapted to: enable each of the pair of shafts to translate along axis of each shaft while force is applied, and return each of the pair of shafts to default positions while no force is applied to each of the pair of shafts; and force transmission elements adapted to transmit force applied to buttons of the human interface device to the pair of the shafts.

In an embodiment, a system is provided. The system may include a human interface device as discussed above and a sensing system adapted to sense the magnetic field distribution.

The sensing system may be adapted to sense changes in the magnetic field distribution over time.

The sensing system may be adapted to infer rotation of the track ball about two perpendicular axis based on the changes in the magnetic field distribution over time.

The sensing system may be adapted to generate a computer readable signal based on the inferred rotation of the track ball.

The human interface device may include: at least one button, wherein the pair of magnets may be mechanically coupled to the button to encode depression of the at least one button in the magnetic field distribution.

The sensing system may be adapted to infer depression of the at least one button based on changes in the magnetic field distribution over time.

The sensing system may be adapted to generate a computer readable signal based on the inferred depression of the at least one button.

The human interface device may be unpowered.

The magnetic field distribution may extend beyond boundaries of the human interface device to facilitate sensing of the magnetic field distribution by the sensing system.

The sensing system may include a matt with an embedded array of sensing elements, each of the sensing elements may be adapted to sense a magnitude and orientation of a portion of the magnetic field distribution proximate to the respective sensing element.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions may be sensed by various devices, and the sensing may be interpreted (e.g., translated) into the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, reduce the portability of the devices (e.g., mouses), and/or may be undesirable for other reasons.

In general, embodiments disclosed herein may provide methods, systems, and/or devices for obtaining user input and/or using the obtained user input to provide computer implemented services. To provide the computer implemented services, a system may include data processing system 100.

Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which the user may provide information to manage and/or use the computer implemented services provided by data processing system 100.

To obtain the information from the user, data processing system 100 may obtain signals and/or data from sensing system 102 (e.g., via operable connection 106). Data processing system 100 may interpret (e.g., translate) the signals (e.g., may be analog, data processing system 100 may include an analog to digital converter) and/or data (e.g., digital data) to obtain the user input.

Sensing system 102 may track (e.g., by sensing 108) and/or provide information regarding tracking of human interface device 104, and provide the signals and/or data to data processing system 100. A user may physically interact with human interface device 104, thereby allowing the signals and/or data provided by sensing system 102 to include information regarding the physical actions of the user.

For example, if a user moves human interface device 104, sensing system 102 may track the change in position and/or motion of human interface device 104 and provide signals and/or data reflecting the changes in position and/or motion. Similarly, if a user actuates an actuatable portion (e.g., buttons) of human interface device, sensing system 102 may track the actuation of the actuatable portion and provide signals and/or data reflecting the actuation.

To track human interface device 104, sensing system 102 may include one or more sensors that sense a magnetic field distribution emanating from human interface device 104. The sensors may use the sensed magnetic field distribution to track a location (absolute or relative) and orientation (absolute or relative) of a pair of magnets embedded in human interface device 104. The sensors may generate the signals and/or data provided by sensing system 102 to data processing system 100. The sensors may sense the magnitude and/or direction of the magnetic field distribution that passes proximate to each sensor. By knowing the relative placements of the sensors with respect to one another, the position and/or orientation of the pair of magnets may be known (e.g., the magnetic field distribution may be treated as emanating from a pair of magnets with known dimensions and/or strength).

Sensing system 102 may also include, for example, analog to digital converters, digital signal processing devices or other signal processing devices, and/or other devices for generating the signals and/or data based on information obtained via the sensors.

Human interface device 104 may be implemented with a physical device that a user may actuate in one or more ways. For example, human interface device 104 may (i) be moveable, (ii) may include one or more buttons, (iii) may include a track ball, (iv) may include retention elements, (v) may include one or more rotational shafts, (vi) may include force transmission elements, and/or (vii) other actuatable elements. Actuating human interface device 104 may change the orientation and/or position of the pair of magnets with respect to the sensors of sensing system 102.

Figure 2A:
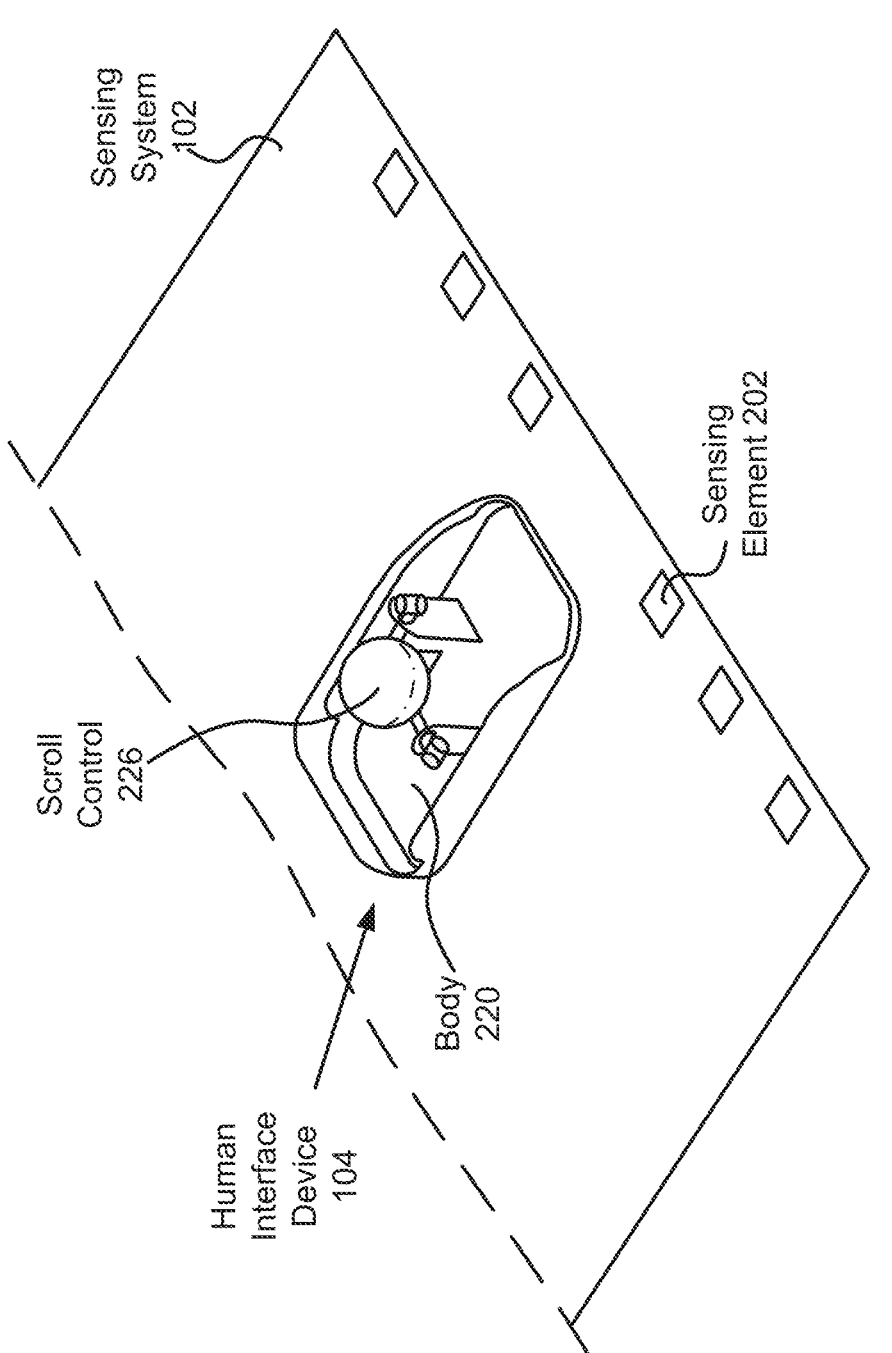
FIG. 2A shows a diagram illustrating a human interface device and a sensing system in accordance with an embodiment.
Figure 2B:
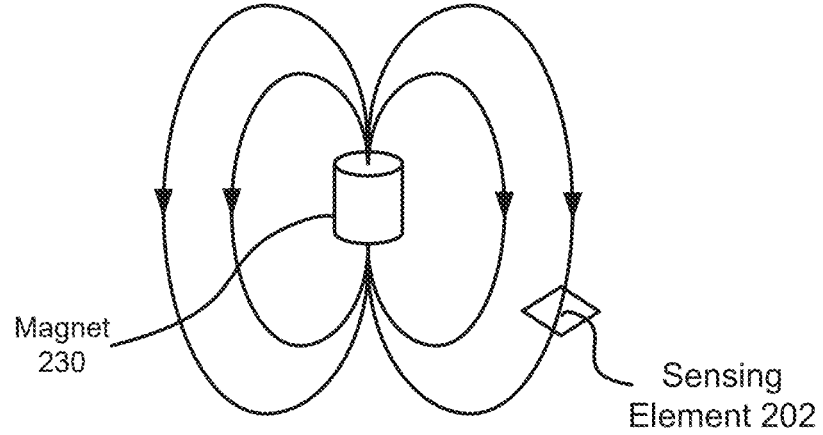
FIGS. 2B-2C show diagrams illustrating field sensing in accordance with an embodiment.
Figure 2C:
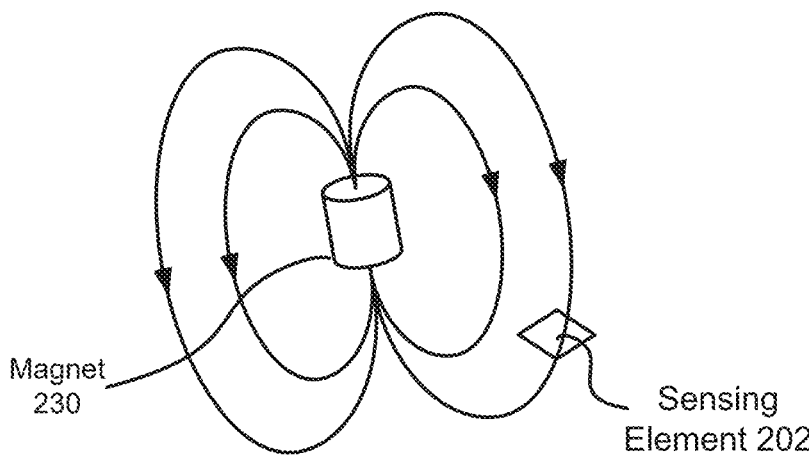

For example, when human interface device 104 is move away from sensing system 102, the strength of the magnetic field distribution emanating from the pair of magnets as sensed by sensors of sensing system 102 may decrease. Similarly, when buttons or other actuatable elements of human interface device 104 are actuated, the pair of magnets may be rotated (e.g., in one or more planes) thereby changing the direction of the magnetic field distribution sensed by sensors of sensing system 102. Refer to FIGS. 2A-2C for additional details regarding sensing of human interface device 104.

Human interface device 104 may be a passive device. For example, human interface device 104 may not consume power, include batteries or sensors, etc. Consequently, human interface device 104 may be of smaller size, lower weight, and/or may provide other advantages when compared to active devices such as a computer mouse. Refer to FIGS. 2C-2J for additional details regarding human interface device 104.

Data processing system 100 may perform a lookup or other type of operation to translate the signals and/or data from sensing system 102 into user input. Once obtained, the user input may be used to drive downstream processes.

Figure 3:
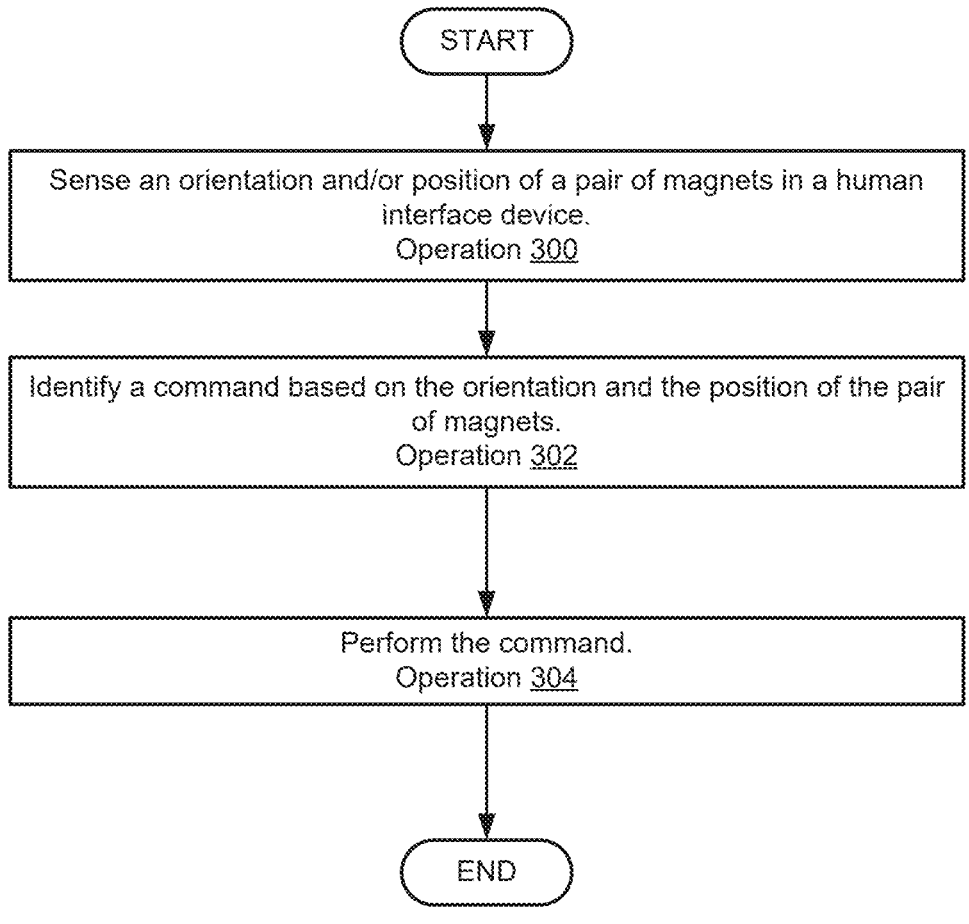
FIG. 3 shows a flow diagram illustrating a method of obtaining user input and providing computer implemented services in accordance with an embodiment.

When providing its functionality, data processing system 100 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection. However, in some embodiments, human interface device 104 may not be operably connected to other device (e.g., may be a passive device), but may be sensed by sensing system 102 via sensing 108. For example, during sensing 108, a static magnetic field distribution emanating from human interface device 104 may be sensed by sensing system 102.

While illustrated in FIG. 1 as included a limited number of specific components, a system in accordance with an embodiment may include fewer, additional, and/or different components than those illustrated therein.

To further clarify embodiments disclosed herein, diagrams illustrating sensing of human interface device 104 in accordance with an embodiment are shown in FIGS. 2A-2C.

Turning to FIG. 2A, an isometric diagram of human interface device 104 and sensing system 102 in accordance with an embodiment is shown.

Figure 2D:
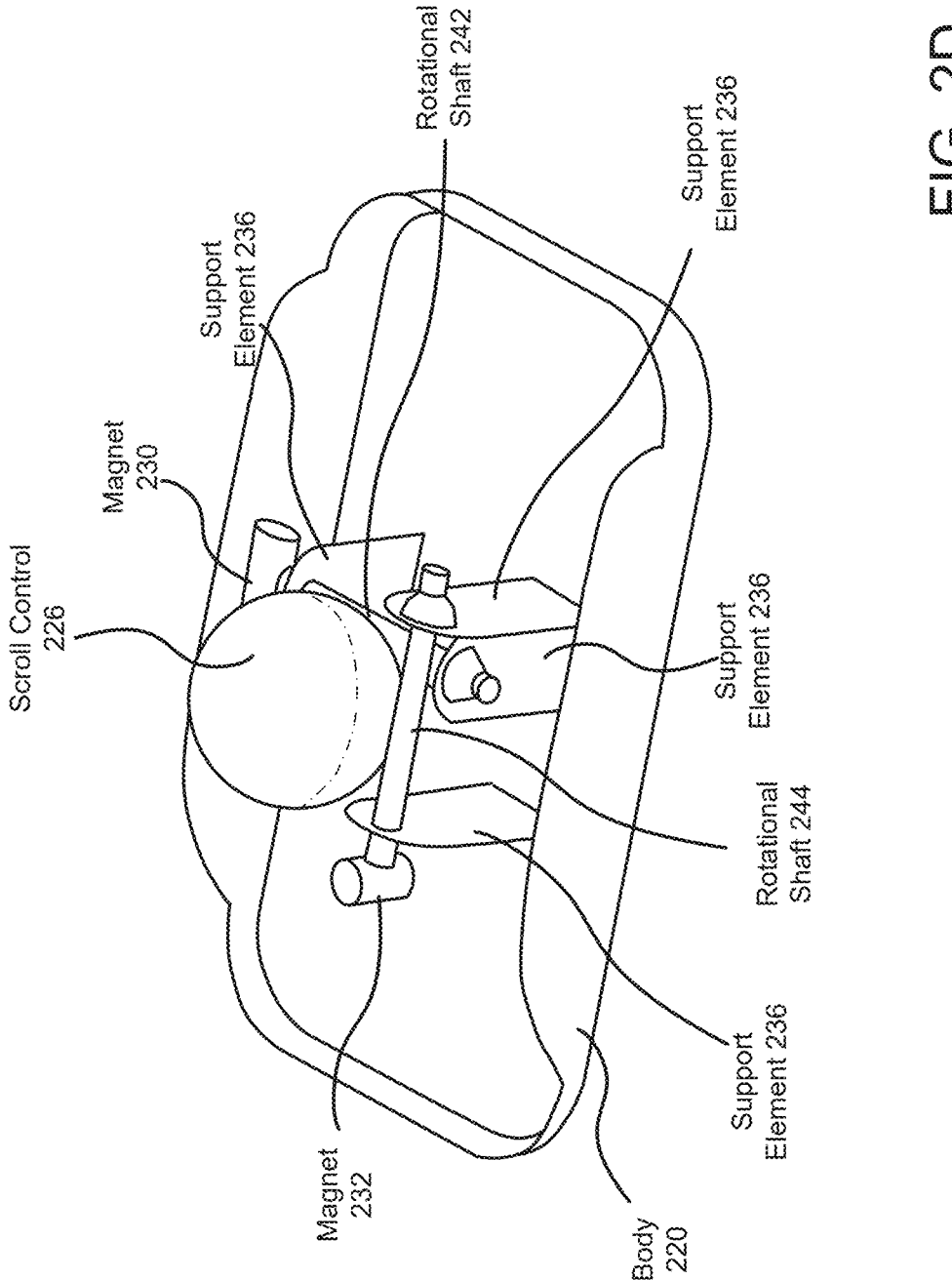
FIGS. 2D-2E show diagrams of a portion of a human interface device in accordance with an embodiment.
Figure 2E:
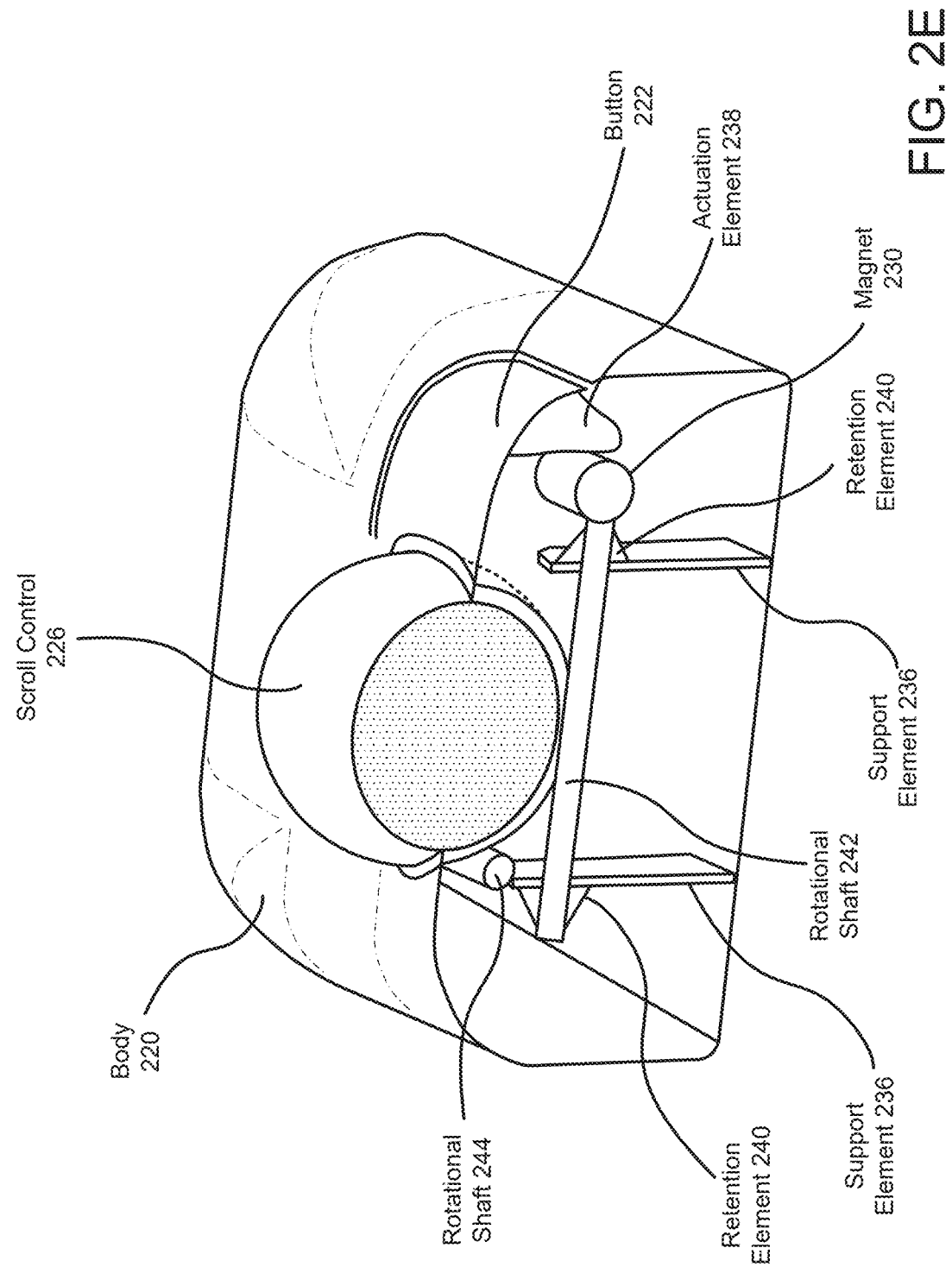
Figure 2F:
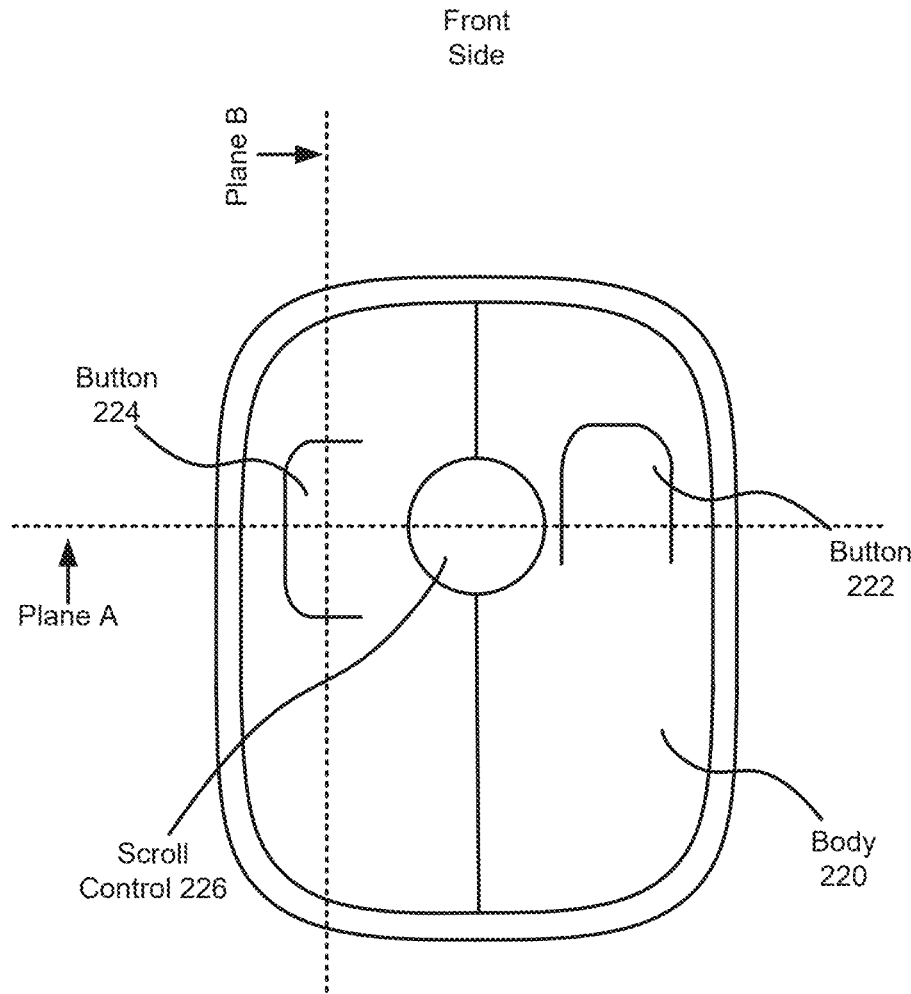
FIG. 2F shows a top view diagram of a human interface device in accordance with an embodiment.

To obtain user input, human interface device 104 may include body 220, and a number of actuatable elements (e.g., 226 and other elements shown in FIGS. 2E-2F). Body 220 may be implemented with a structure upon which other elements may be affixed. For example, body 220 may have a flat bottom that may allow human interface device 104 to slide along a surface on which it is positioned. Thus, one form of actuation of human interface device 104 may be for a person to grip body 220 and apply force to it to move it along the surface (thereby repositioning it with respect to sensing elements of sensing system 102, discussed below).

To obtain user input (in addition to via repositioning), the actuatable elements may include buttons 222-224 (e.g., shown in FIGS. 2E-2F) and a scroll control 226. Generally, the actuatable elements may be positioned on a top surface of human interface device 104, but may be positioned elsewhere (e.g., on side surfaces). The actuatable elements may be actuatable by a person through application of force. Refer to FIGS. 2I-2J for additional details regarding actuation of the actuatable elements by application of force.

Buttons 222-224 may be implemented, for example, with surfaces that may be actuated through application of pressure downward. Application of the pressure may cause the buttons to move towards body 220. A return mechanism may return the buttons to a resting position while force is not applied to it.

Likewise, scroll control 226 may be implemented using, for example, a track ball that may be actuated through application of pressure downward by a user. In contrast to buttons 222-224, scroll control 226 may be actuated differently through application of pressure to different portions of scroll control 226. A return mechanism may return the scroll control 226 to a resting position while force is not applied to it.

Application of force to body 220 may reposition human interface device 104 with respect to sensing elements of sensing system 102. Likewise, application of force to the actuation elements may change a position of the magnets embedded inside of body 220 with respect to the sensing element. For example, application of force to the respective buttons 222-224 may move the position of the respective magnets 230-232 forwards or backwards, in a first plane and a second plane, respectively.

Likewise, application of force to scroll control 226 may rotate the magnets (e.g., magnets 230-232) forward or backwards in a first plane and a second plane, respectively, depending on where force is applied to scroll control 226. The rotation and/or repositioning of the magnets (e.g., magnet 230-232) may modify the magnetic field distribution applied to the sensing elements of sensing system 102. Refer to FIGS. 2B-2C for additional details regarding the magnetic field distribution emanating from human interface device 104. Refer to FIGS. 2D-2E for additional details regarding the pair of magnets embedded in human interface device 104.

Like body 220, the actuatable elements may generally be formed from plastic injection molded or other types of plastic and/or molded parts.

To obtain user input, sensing system 102 may include any number of sensing elements (e.g., 202). The sensing elements may be sensors that monitor a magnitude and direction of a magnetic field distribution, and generate signals or data to reflect these quantities. While not shown, sensing system 102 may include a signal processing chain (e.g., any number of signal conditioning and processing devices) that may condition and process the signals generated by the sensing elements to obtain information regarding the location and/or orientation of the pair of magnets embedded in human interface device 104.

In FIG. 2A, sensing system 102 is illustrated in the form of a mat, a pad or other structure upon which human interface device 104 may be positioned (the dashed line to the top left of the drawing indicates that the structure may continue on beyond that which is explicitly illustrated). However, sensing system 102 may be implemented with other types of structures.

Additionally, while the sensing elements are illustrated with example positions, it will be appreciated that the sensing elements may be positioned differently without departing from embodiments disclosed herein.

Turning to FIGS. 2B-2C, diagrams illustrating a magnet and sensing element 202 in accordance with an embodiment are shown. As noted above, human interface device 104 may include magnet 230. Magnet 230 may project a magnetic field. In these figures, the magnetic field is illustrated using lines with arrows superimposed over the midpoints of the lines. The direction of the arrow indicates and orientation of the field.

As seen in FIG. 2B, when magnet 230 is proximate (e.g., within a predetermined distance range, which may vary depending on the strength of magnet 230 and sensitivity level of sensing element 202) to sensing element 202, the magnetic field may be of sufficient strength to be measurable by sensing element 202. Sensing element 202 may utilize any sensing technology to measure the magnitude and/or the orientation of the magnetic field at its location. Due to the field distribution of magnet 230, the magnitude and orientation of the magnetic field at the location of sensing element 202 may be usable to identify, in part, the location and orientation of magnet 230.

For example, when magnet 230 is rotated as shown in FIG. 2C from the orientation as shown in FIG. 2B, the direction and/or magnitude of the magnetic field at the location of sensing element 202 may change. By identifying the magnitude and orientation of the magnetic field at a number of locations (e.g., corresponding to different sensing elements), the position and orientation of magnet 230 may be identified.

Although one individual magnet (e.g., magnet 230) is depicted in FIGS. 2B-2C, it is to be understood that multiple magnets (e.g., magnets 230-232) may be included in the description of FIGS. 2B-2C. For example, human interface device 104 may include a pair of magnets, such as magnet 230 and magnet 232 (shown in FIG. 2D), that emanate a magnetic field distribution.

To utilize the location and orientation of the pair of magnets embedded in human interface device 104 to obtain user input, magnets 230-232 may be mechanically coupled to the actuatable elements and body 220. Turning to FIGS. 2D-2J, diagrams illustrating mechanical coupling between magnets 230-232 and various portions of human interface device 104 in accordance with an embodiment are shown.

In FIG. 2D, a diagram of a portion of human interface device 104 in accordance with an embodiment is shown. The view may be looking at a downward angle towards the inside of body 220 shown in FIG. 2A. In this figure, elevation lines that indicate surface contours of human interface device 104 are illustrated using dashed lines separated by a dot (e.g., the outline of scroll control 226 below the dashed-dot line may be under the top surface of body 220).

To mechanically couple magnets 230-232 to buttons 222-224 (respectively), scroll control 226, and body 220, human interface device 104 may include two mechanical linkages.

A first mechanical linkage may connect magnets 230-232 to scroll control 226 and a second mechanical linkage may connect magnets 230-232 to buttons 222-224 (not shown in FIG. 2D) and buttons 222-224 to body 220. Refer to FIG. 2E for additional details regarding the second mechanical linkage for human interface device 104.

The first mechanical linkage may include rotational shafts (e.g., 242-244) and support elements (e.g., 236). Rotational shafts 242-244 may be implemented with a post, bar, or other mechanical structure. For example, the structures may include two bars positioned perpendicular to each other (e.g., in planes that are at right angles to each other). Each of the bars may be attached to a corresponding magnet (e.g., magnet 230 and/or magnet 232) and one side of the scroll control (e.g., 226).

For example, magnet 230 may be fixedly attached (e.g., via adhesive or other means) to one end of rotational shaft 242 and rotational shaft 242 may be physically in contact with first side of scroll control 226. Likewise, magnet 232 may be fixedly attached (e.g., via adhesive or other means) to one end of rotational shaft 244 (e.g., perpendicular to magnet 230) and rotational shaft 244 may be physically in contact with a second side scroll control 226 (e.g., perpendicular to the first side of scroll control 226).

Each of the rotational shafts (e.g., rotational shaft 242-224) may facilitate rotation of the corresponding magnet (e.g., magnet 230 and/or magnet 232). For example, when a force is applied to a front and/or back portion of scroll control 226, the force may be transmitted to rotational shaft 242 attached to magnet 230. The force may cause rotational shaft 242 to rotate thereby allowing for rotation of magnet 230.

Similarly, when a force is applied to a side portion of scroll control 226, the force may be transmitted to rotational shaft 244 attached to magnet 232. The force may cause rotational shaft 244 to rotate thereby allowing for rotation of magnet 232.

The first mechanical linkage may include support elements (e.g., 236). Support element 236 may be implemented with a post, bar, or other mechanical structure. The structure may extend from a bottom surface of body 220 and the extended end of the structure may attach to an end of a corresponding rotational shaft (e.g., rotational shaft 242 and/or 244) thereby providing support for the rotational shafts while facilitating rotation of the rotational shafts.

Each of the rotational shafts (e.g., 242-244) may be supported by two support elements (e.g., 236) positioned on opposite ends of the rotational shaft. For example, in regard to rotational shaft 242, two support elements (e.g., 236) may extend from a bottom surface of body 220 by a first distance (e.g., that is less than a second distance over which support elements 236 extends to attach to rotational shaft 244) and each extended end of the support elements (e.g., 236) may attach to opposite ends of rotational shaft 242.

For example, in regard to rotational shaft 244, two support elements (e.g., 236) may extend from a bottom surface of body 220 by a second distance (e.g., that is greater than the first distance) and each extended end of the support elements (e.g., 236) may attach to opposite ends of rotational shaft 244. Although the distance of support elements 236 attached to rotational shaft 242 are illustrated (e.g., in FIGS. 2D-2E and 2G-2J) and described above as less than the distance of support elements 236 attached to rotational shaft 244, it should be appreciated that the distance of support elements 236 attached to rotational shaft 242 may be greater than the distance of support elements 236 attached to rotational shaft 244.

Turning to FIG. 2E, a diagram of a portion of human interface device 104 in accordance with an embodiment is shown. The view may be looking downward towards an inside view of human interface device 104 shown in FIG. 2D from a back side of human interface device 104.

In FIG. 2E, elevation lines that indicate surface contours of human interface device 104 may be illustrated using varying types of lines and infill patterns. For example, the dashed lines separated by a dot (dashed-dot lines) represents curves in the top surface of body 220. The outline of scroll control 226 may continue below the top surface of body 220 which is illustrated using a dashed line and the infill pattern of dots indicates that the structure may continue beyond that which is explicitly illustrated.

As mentioned above in FIG. 2D, the second mechanical linkage (e.g., for human interface device 104) may connect magnets 230-232 to buttons 222-224, respectively, and buttons 222-224 to body 220.

The second mechanical linkage may include actuation elements (e.g., 238) and retention elements (e.g., 240). Actuation element 238 may be implemented with a post, bar, or other mechanical structure. The structure may extend from a bottom surface of one or both of buttons 222-224 by a distance greater than and/or equal to the vertical position of magnets 230-232 and/or rotational shafts 242-244. As will be discussed in greater detail below, the actuation elements may be positioned with other structures to limit the degree of movement of the rotational shafts and to generate auditory signals (e.g., clicking noises) for users of human interface device 104.

Actuation element 238 may facilitate movement of magnets 230-232 along an axis of the respective rotational shaft. For example, when force is applied to button 222, the force may be transmitted to actuation element 238. The force may cause actuation element 238 to flex and/or push towards rotational shaft 242 and magnet 230 (attached to rotational shaft 242) thereby allowing rotational shaft 242 and magnet 230 to translate along the axis of rotational shaft 242.

Retention elements 240 may be implemented with a rubber dome, spring, or other structure. The structure may be coupled to one and/or both of the rotational shafts (e.g., 242-244) and positioned at one or both ends of the rotational shafts. For example, two retention elements (e.g., 240) may be positioned on opposite sides of rotational shaft 242: a first retention element positioned in between magnet 230 and support element 236 at a first end of rotational shaft 242, and a second retention element positioned after support element 236 at a second end of rotational shaft 242.

Retention element 240 may facilitate movement of magnets 230-232 (at least with respect to linear movement along the axis of the respective rotational shaft). For example, when force is applied to one of buttons 222-224, the force may be transmitted to the retention elements. The force may cause the retention elements to flex thereby allowing for linear movement of rotational shafts 242-244 and magnets 230-232, respectively.

Retention element 240 may be formed with a rubber material and may include specific mechanical features (e.g., thickness, relief elements, etc.) to facilitate the flex and automatic return to the neutral position of retention element 240. Consequently, when force is no longer applied to buttons 222-224, magnets 230-232 may be automatically returned to the neutral position (at least with respect to position along the axis of the respective rotational shaft).

To further clarify the operation of human interface device, cross section views of human interface device 104 in accordance with an embodiment are shown in FIGS. 2G-2H and 2I-2J. Top view of human interface device 104 in accordance with an embodiment is shown in FIG. 2F to illustrate the locations of the planes in which the cross views are taken.

Turning to FIG. 2F, a first top view diagram of human interface device 104 in accordance with an embodiment is shown. As seen in FIG. 2F, the top of human interface device 104 may be substantially covered with buttons 222-224 and scroll control 226. To actuate buttons 222-224, force may be applied downward into the page on any portion of the respective button. The direction of movement of magnets 230-232 may correspond to the respective buttons (e.g., perpendicular to one another).

To actuate scroll control 226, downward force may be applied to scroll control 226. However, the location to which the force is applied may dictate the direction of the rotation of the magnets. With respect to FIG. 2F, if force is applied to a top half of scroll control 226, then magnet 230 may rotate in a first direction in a first plane. In contrast, if force is applied to a bottom half of scroll control 226, then magnet 230 may rotate in a second direction in the first plane.

Similarly, if force is applied to a left-side or right side of scroll control 226, then magnet 232 may rotate in a first direction in a second plane. In contrast, if force is applied to a right side of scroll control 226, then magnet 232 may rotate in a second direction in the second plane. The first plane and the second plane may be substantially (e.g., withing a few degrees such as 3°) perpendicular or orthogonal to one another.

In FIG. 2F, two planes (i.e., Plane A and Plane B) are illustrated using respective dashed lines. The diagrams shown in FIG. 2G may correspond to Plane A, while the diagrams shown in FIGS. 2H, 2I, and 2J may correspond to Plane B.

Figure 2G:
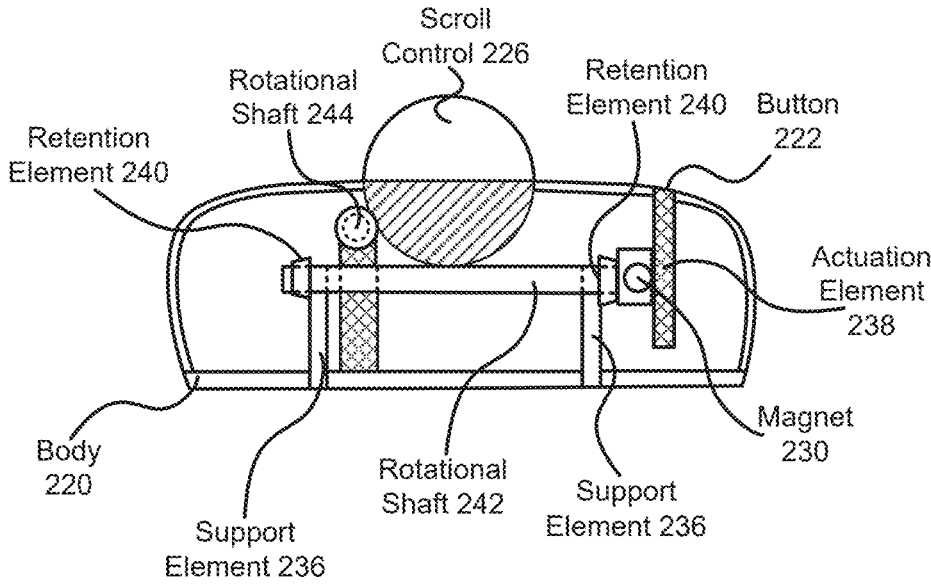

Turning to FIG. 2G, a first cross section diagram of human interface device 104 in accordance with an embodiment is shown. As seen in FIG. 2G, when positioned with body 220, support elements 236 may support rotational shaft 242, magnet 230, and scroll control 226 above body 220. For example, scroll control 226 may be positioned on rotational shaft 242, and may extend above body 220 thereby allowing a user to apply pressure to it. Magnet 230 may be mechanically coupled to scroll control 226 via rotational shaft 242.

Consequently, when force is applied to scroll control 226, rotational shaft 242 may rotate thereby allowing magnet 230 to rotate in the direction in which the rotational shaft is rotating. The direction of rotation of rotational shaft 242 may be forward while force is applied to a top portion of scroll control 226 and thereby facilitating rotation of magnet 230 in the forward direction. Conversely, the direction of rotation of rotational shaft 242 may be backward while a force is applied to a bottom portion of scroll control 226 and thereby facilitating rotation of magnet 230 in the backward direction.

The magnetic pole of magnet 230 may be aligned with Plane A and rotation of magnet 230 may cause portions of the magnetic field distribution to rotate thereby providing, for example, sensing system 102 (shown in FIG. 2A) a direction of movement of scroll control 226 in a first plane (e.g., plane A). As will be discussed with respect to FIG. 3, the degree of rotation may be used to identify different types of user input that a user is attempting to convey through actuation of scroll control 226.

As seen in FIG. 2G, when positioned with body 220, rotational shaft 242 may also facilitate movement of the position of magnet 230. Magnet 230 may be coupled to button 222 via actuation element 238, which may be attached to button 222. Consequently, when force is applied to button 222, actuation element 238 may flex toward magnet 230 and rotational shaft 242 thereby causing retention element 240 to flex and allowing rotational shaft 242 and magnet 230 (attached to rotational shaft 242) to translate in a linear direction along the axis of rotational shaft 242.

Figure 2H:
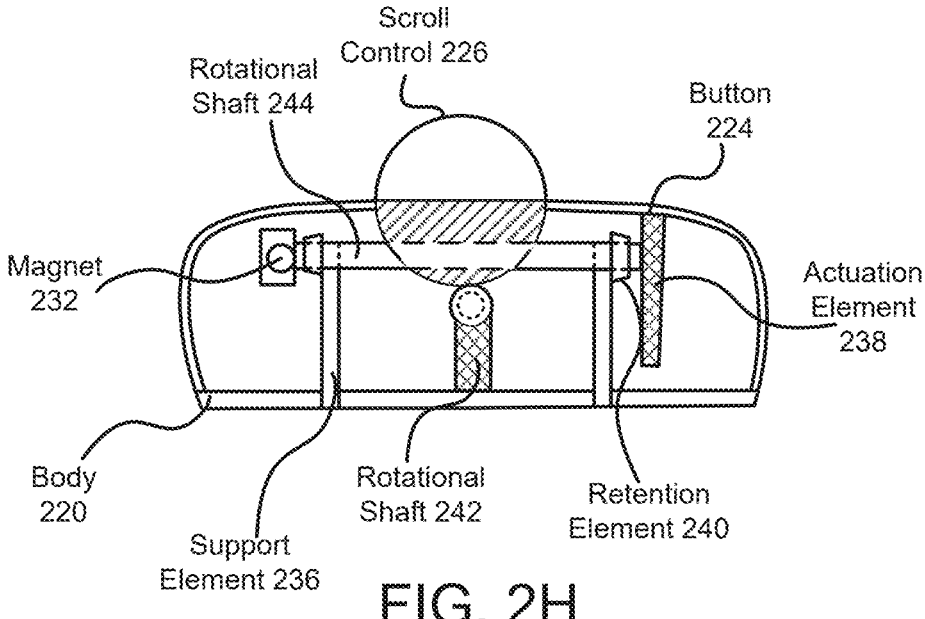
Figure 21:
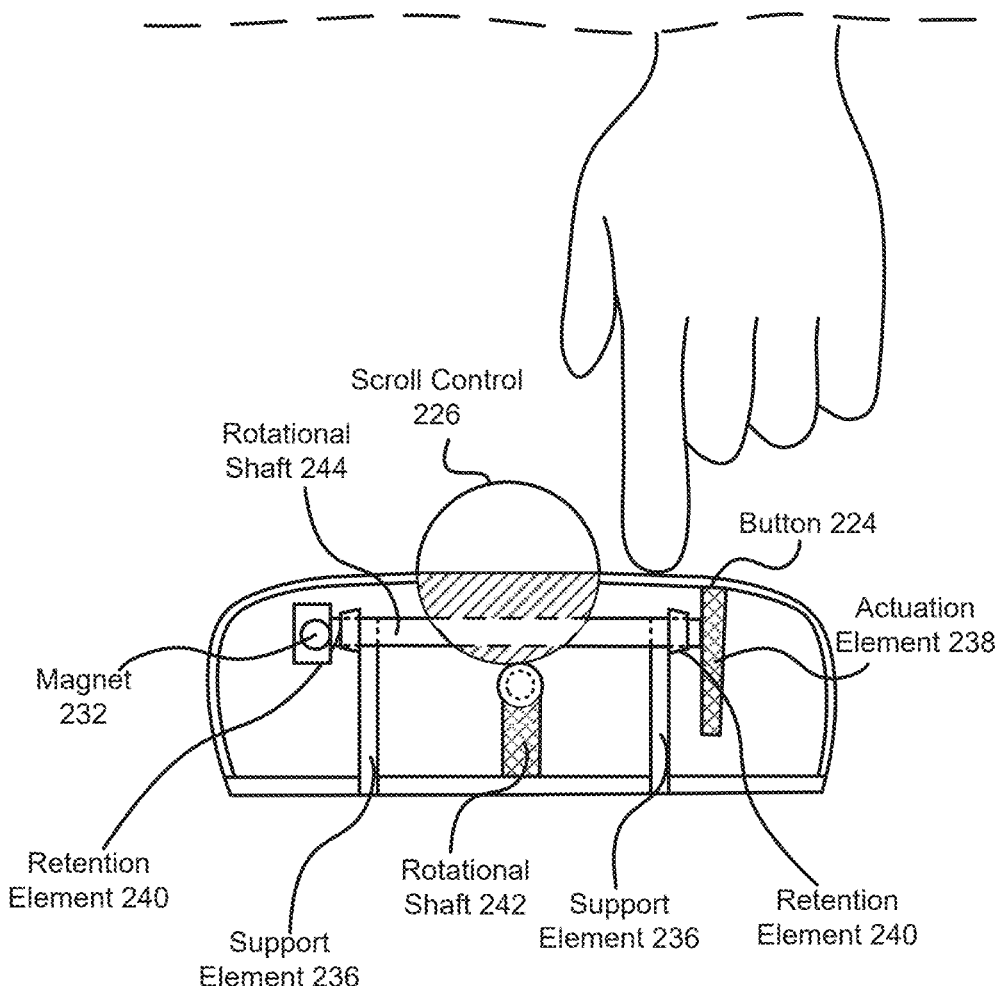
Figure 2J:
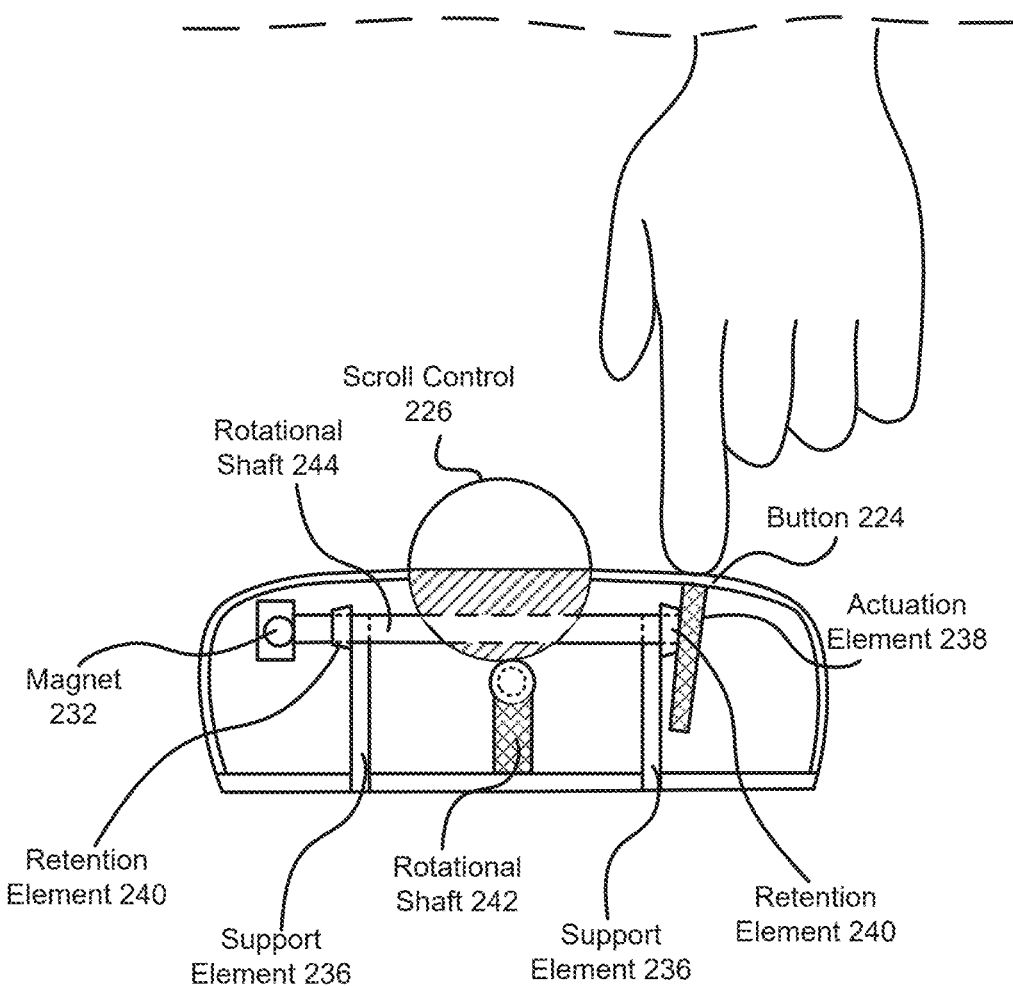

Turning to FIG. 2H, a second cross section diagram of human interface device 104 in accordance with an embodiment is shown. As seen in FIG. 2H, while supported by support elements (e.g., 236), rotational shaft 244 may facilitate rotation of magnet 232. For example, when force is applied to scroll control 226, rotational shaft 244 and magnet 232 (attached to rotational shaft 244) may rotate (downward or upwards, depending on which side of scroll control 226 received applied force).

The magnetic pole of magnet 232 may be aligned with Plane B and rotation of magnet 232 may cause portions of the magnetic field distribution to rotate thereby providing, for example, sensing system 102 (shown in FIG. 2A) a direction of movement of scroll control 226 in the second plane (e.g., plane B). As will be discussed with respect to FIG. 3, the degree of rotation may be used to identify different types of user input that a user is attempting to convey through actuation of scroll control 226.

Rotational shaft 242 may also facilitate repositioning of magnet 230 (e.g., with respect to linear movement of the position of magnet 230). As will be illustrated in FIGS. 2I-2J, actuation of button 224 may cause the corresponding actuation element to contact rotational shaft 244 thereby causing rotational shaft 244 and magnet 232 (attached to rotational shaft 244) to translate along the axis of the rotational shaft (e.g., move position of magnet 232 in the direction along the axis of the shaft).

Turning to FIG. 2I, a third cross section diagram of human interface device 104 in accordance with an embodiment is shown. The diagram shown in FIG. 2I may be similar to that shown in FIG. 2H. As seen in FIG. 2I, when force is applied to button 224, actuation element 238 may move towards rotational shaft 244 thereby allowing retention element 240 to flex to enable rotational shaft 244 and magnet 232 (attached to rotational shaft 244) to translate leftward along the axis of rotational shaft 244 in this example. The degree of linear movement of position of magnets 230-232 may be limited by the geometry of the rotational shaft (e.g., 242, 244), the retention element (e.g., 240), actuation element (e.g., 238), and/or the buttons (e.g., 222-224) that may form the rest of the top surface of human interface device 104. Thus, for example, magnet 232 and rotational shaft 244 may translate around, for example, 1 to 2 millimeters (mm) in this plane when button 224 is pushed. However, it will be appreciated that larger or smaller amounts of translation may be used depending on, for example, the structure of the buttons, retention element, rotational shaft, actuation element, etc.

Turning to FIG. 2J, a fourth cross section diagram of human interface device 104 in accordance with an embodiment is shown. As seen in FIG. 2J, when force is applied to button 224, actuation element 238 may move toward rotational shaft 244 thereby allowing retention element 240 to flex and rotational shaft 244 and magnet 232 (attached to rotational shaft 244) to translate along the axis of rotational shaft 244. In comparison to the FIG. 2I, the translation of magnet 232 and rotational shaft 244 as illustrated in this figure might be larger and the amount of translation might vary depending on the geometry of the buttons, the rotational shaft, the retention element, etc. as noted above.

It will be appreciated that the extent of the translation along the axis of the rotational shaft may vary without departing from embodiment disclosed herein.

While FIGS. 2A-2J have been illustrated as including specific numbers and types of components, it will be appreciated that any of the devices depicted therein may fewer, additional, and/or different components without departing from embodiments disclosed herein.

As discussed above, the components of FIG. 1 may perform various methods to provide computer implemented services using user input. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of obtaining user input in accordance with an embodiment is shown. The method may be performed by data processing system 100, sensing system 102, human interface device 104, and/or other components of the system of FIG. 1.

At operation 300, an orientation and/or position of a pair of magnets in a human interface device is/are sensed. The orientation and/or position may be sensed by (i) obtaining measurements of a magnetic field distribution emanating from the pair of magnets, and (ii) computing the orientation and/or position based on the measurements.

At operation 302, a command is identified based on the orientation and/or position of the pair of magnets. The command may be identified, for example, by comparing the position and/or orientation to a past position and/or orientation.

The command may be identified by (i) identifying an orientation of the pair of magnets, (ii) identifying a position of the pair of magnets, and (iii) identifying the location of the pair of magnets with respect to a sensing system.

The orientation of the pair of magnets may be used to perform a lookup based on a degree and direction of rotation of the pair of magnets. For example, if positively rotated by an amount exceeding a threshold, then the command may be identified as scrolling in a first direction and a rate of the scrolling may be identified (e.g., scaled) based on a degree of excess of the rotation beyond the threshold. In another example, if negatively rotated by an amount exceeding the threshold, then the command may be identified as scrolling in a second direction (opposite of the first, or another direction) and a rate of the scrolling may be identified (e.g., scaled) based on a degree of excess of the rotation beyond the threshold.

The command may also be identified by, for example, using the position of the pair of magnets to identify a depression of at least one button. The position of the pair of magnets may be used to perform a lookup based on a degree and direction of position of the pair of magnets in two perpendicular axis. For example, if positively moved by an amount exceeding a threshold, then the command may be identified as a left click of a pointing device. In another example, if negatively rotated by the amount exceeding the threshold, then the command may be identified as a right click of the pointing device. The command may be based on other characteristics of the magnets, such as acceleration. For example, the magnets may be mechanically coupled using an element that tends to return to a position at rest quickly. Likewise, the mechanical coupling may prevent motion of the magnets until a threshold force is applied. Once overcome, the resistance to the motion of the magnets may be greatly reduced thereby allowing for rapid acceleration/movement of the magnets. Once at an end of a degree of travel, the magnets may be rapidly decelerated. The acceleration/velocity signatures of the magnets The command may also be identified by, for example, using the position of the human interface device to identify a change in focus of the user (e.g., a mouse location on a display). The combination of the focus of the user and the user input (e.g., based on the user clicking a button, depressing a scroll wheel, etc.) may then be used to identify, for example, a function of an application or other type of functionality to be initiated or otherwise performed.

At operation 304, the command is performed. The command may be performed, for example, by an operating system passing through or otherwise providing information regarding the command to an application or other consumer of the user input. The consumer may then take action based on the command.

For example, a data processing system may host an operating system, drivers, and/or other executing entities that may take responsibility for translating signals/data from a sensing system into commands or other types of user input.

The method may end following operation 304.

Thus, using the method illustrated in FIG. 3, embodiments disclosed herein may facilitate obtaining user input and using the user input to provide computer implemented services. By obtaining the user input via a passive device (at least with respect to user input), a human interface device in accordance with embodiments disclosed herein may be of lower complexity thereby improving the likelihood of continued operation, may not be dependent on power sources, may not require as large of physical loads to be exerted by users, and may provide other benefits.

Figure 4:
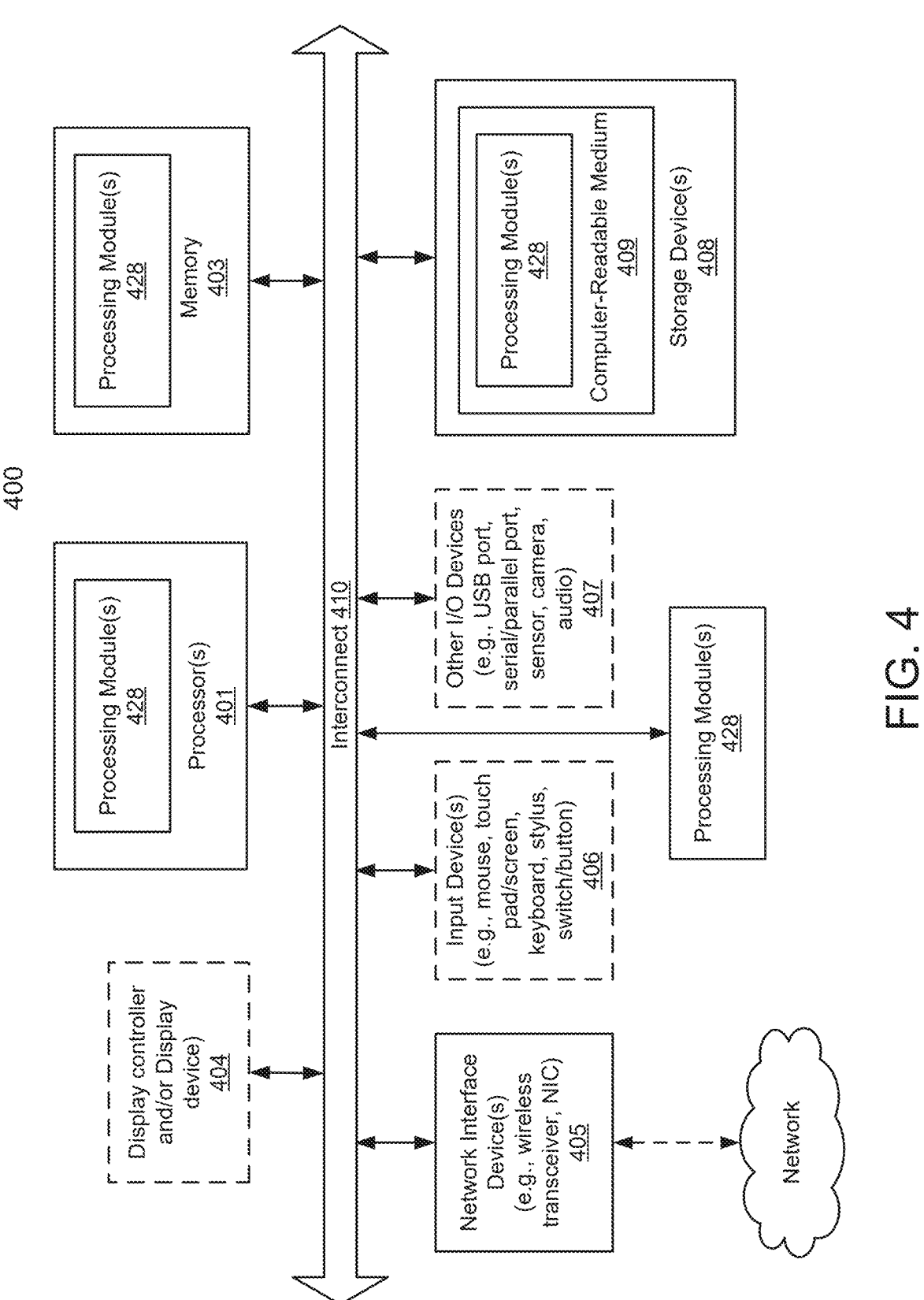
FIG. 4 shows a block diagram illustrating a data processing system in accordance with an embodiment.

Any of the components illustrated in FIGS. 1-2J may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an acceler-ometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable stor-age medium 409 (also known as a machine-readable storage medium or a computer-readable medium) on which is stored one or more sets of instructions or software (e.g., processing module, unit, and/or processing module/unit/logic 428) embodying any one or more of the methodologies or func-tions described herein. Processing module/unit/logic 428 may represent any of the components described above. Processing module/unit/logic 428 may also reside, com-pletely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above per-sistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memo-ries, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of inter-connecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic repre-sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requir-ing physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com-puting device, that manipulates and transforms data repre-sented as physical (electronic) quantities within the com-puter system's registers and memories into other data similarly represented as physical quantities within the com-puter system memories or registers or other such informa-tion storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A human interface device, comprising:
a button;
a scroll control;
a pair of magnets mechanically coupled to the scroll control to encode movement of the scroll control in a magnetic field distribution emanating from the pair of magnets;
a first mechanical linkage that couples the pair of magnets to the scroll control to facilitate a rotation of at least one of the pair of magnets in response to a force applied to the scroll control; and
a second mechanical linkage that couples the pair of magnets to the button to facilitate a linear movement of at least one of the pair of magnets in response to a force applied to the button,
wherein the second mechanical linkage comprises a retention element coupled to at least one shaft of a pair of shafts of the first mechanical linkage, the retention element being adapted to:
enable the at least one shaft of the pair of shafts to translate along an axis of the at least one shaft, and
enable the at least one shaft to return to a default position.

2. The human interface device of claim 1, wherein the pair of magnets are positioned on different sides of the scroll control.

3. The human interface device of claim 1, wherein magnetic poles of the pair of magnets are aligned with planes that are at right angles to each other.

4. The human interface device of claim 1, wherein the pair of magnets are further mechanically coupled to encode depressions of the button in the magnetic field distribution.

5. The human interface device of claim 1, wherein a rotation of the scroll control causes portions of the magnetic field distribution to rotate.

6. The human interface device of claim 5, wherein a depression of the button causes the portions of the magnetic field distribution to translate.

7. The human interface device of claim 6, wherein releasing depression of the button causes the portions of the magnetic field distribution to return to a default set of positions.

8. The human interface device of claim 1, wherein the human interface device is unpowered.

9. The human interface device of claim 1, wherein the magnetic field distribution extends beyond boundaries of the human interface device to facilitate sensing of the magnetic field distribution by sensing systems.

10. The human interface device of claim 1, wherein the pair of shafts are in physical contact with the scroll control and positioned:
in planes that are at right angles to one another, and
offset from one another,
wherein the human interface device further comprises a force transmission element adapted to transmit the force applied to the button of the human interface device to the pair of the shafts.

11. A system, comprising:
a human interface device, comprising:
a button;
a scroll control;
a pair of magnets mechanically coupled to the scroll control to encode movement of the scroll control in a magnetic field distribution emanating from the pair of magnets;
a first mechanical linkage that couples the pair of magnets to the scroll control to facilitate a rotation of at least one of the pair of magnets in response to a force applied to the scroll control; and
a second mechanical linkage that couples the pair of magnets to the button to facilitate a linear movement of at least one of the pair of magnets in response to a force applied to the button; and
a sensing system adapted to sense the magnetic field distribution,
wherein the second mechanical linkage comprises a retention element coupled to at least one shaft of a pair of shafts of the first mechanical linkage, the retention element being adapted to:
enable the at least one shaft to translate along an axis of the at least one shaft, and enable the at least one shaft to return to a default position.

12. The system of claim 11, wherein the sensing system is adapted to sense changes in the magnetic field distribution over time.

13. The system of claim 12, wherein the sensing system is adapted to infer rotation of the scroll control about two perpendicular axes based on the changes in the magnetic field distribution over time.

14. The system of claim 13, wherein the sensing system is adapted to generate a computer readable signal based on the inferred rotation of the scroll control.

15. The system of claim 11, wherein the pair of magnets is mechanically coupled to the button to encode depressions of the button in the magnetic field distribution.

16. The system of claim 15, wherein the sensing system is adapted to infer the depressions of the button based on changes in the magnetic field distribution over time.

17. The system of claim 16, wherein the sensing system is adapted to generate a computer readable signal based on the inferred depressions of the button.

18. The system of claim 11, wherein the human interface device is unpowered.

19. The system of claim 11, wherein the magnetic field distribution extends beyond boundaries of the human interface device to facilitate sensing of the magnetic field distribution by the sensing system.

20. The system of claim 11, wherein the sensing system comprises a matt with an embedded array of sensing elements, each of the sensing elements being adapted to sense a magnitude and orientation of a portion of the magnetic field distribution proximate to the respective sensing element.

* * * * *